(12) United States Patent
Ehrbar et al.

(10) Patent No.: US 9,440,753 B2
(45) Date of Patent: Sep. 13, 2016

(54) DOSAGE-DISPENSING HEAD

(71) Applicant: Mettler-Toledo AG, Greifensee (CH)

(72) Inventors: Sandra Ehrbar, Volketswil (CH); Michael Meyer, Islisberg (CH)

(73) Assignee: Mettler-Toledo GmbH, Greifensee (CH)

( * ) Notice: Subject to any disclaimer, the term of this patent is extended or adjusted under 35 U.S.C. 154(b) by 5 days.

(21) Appl. No.: 14/329,458

(22) Filed: Jul. 11, 2014

(65) Prior Publication Data
US 2015/0021362 A1   Jan. 22, 2015

(30) Foreign Application Priority Data

Jul. 22, 2013 (EP) .................................. 13177422

(51) Int. Cl.
| | |
|---|---|
| G01F 11/10 | (2006.01) |
| B65B 39/00 | (2006.01) |
| B65B 1/08 | (2006.01) |
| B65B 1/36 | (2006.01) |
| G01F 11/32 | (2006.01) |
| G01F 11/34 | (2006.01) |

(52) U.S. Cl.
CPC . B65B 1/08 (2013.01); B65B 1/36 (2013.01); G01F 11/32 (2013.01); G01F 11/34 (2013.01)

(58) Field of Classification Search
CPC .... G01F 13/001; G01F 13/005; G01F 11/18; G01F 11/32; G01F 11/34; B65B 39/004; B65B 1/08; B65B 1/36
USPC ....... 222/344, 361, 355, 365, 509, 518, 241, 222/548, 370, 367, 341, 351, 358, 571, 501, 222/425, 448, 449; 215/289, 306; 141/374
See application file for complete search history.

(56) References Cited

U.S. PATENT DOCUMENTS

| | | | | |
|---|---|---|---|---|
| 1,637,189 A | * | 7/1927 | Helberger | A47K 5/10 222/246 |
| 2,090,532 A | * | 8/1937 | Hobbs | G01F 11/16 222/365 |
| 3,790,040 A | * | 2/1974 | Bahr | G01F 13/005 222/413 |
| 4,438,479 A | * | 3/1984 | Schwartz | H05F 3/06 222/180 |
| 5,138,979 A | * | 8/1992 | Baird | A01K 61/02 119/51.04 |
| 5,161,524 A | * | 11/1992 | Evans | A61M 15/0065 128/200.24 |
| 5,239,992 A | * | 8/1993 | Bougamont | A61M 15/0065 128/203.12 |
| 5,259,537 A | * | 11/1993 | Beers | G01F 11/18 222/246 |
| 5,822,958 A | * | 10/1998 | Davis | B65B 39/00 137/240 |
| 5,897,010 A | * | 4/1999 | Soyka, Jr. | B65D 23/12 215/383 |
| 6,398,083 B2 | | 6/2002 | Nybakke | |
| 8,042,711 B2 | | 10/2011 | Luechinger et al. | |
| 8,191,587 B2 | | 6/2012 | Luechinger et al. | |

(Continued)

*Primary Examiner* — Paul R Durand
*Assistant Examiner* — Charles P Cheyney
(74) *Attorney, Agent, or Firm* — Standley Law Group LLP

(57) ABSTRACT

A head (5) is associated with a device (1) for dispensing measured dosages of a free-flowing material. The head has housing (3) with an interior space (59) with a fill opening (57) and a discharge orifice (62). A shutter bolt (80) is arranged in the housing to open and close the discharge orifice (62) and to loosen and advance the material. The head (5) has a dispensing position, in which the shutter bolt is oriented substantially vertically and a fill position. In the dispensing position, the material is dispensed through the discharge orifice (62). In the fill position, material is filled through the fill opening (57), which is positioned laterally on the housing when the head is in the dispensing position. A rest surface (51) is diametrically opposite the fill opening, so that the head lies on its rest surface in the fill position.

17 Claims, 4 Drawing Sheets

(56) References Cited

U.S. PATENT DOCUMENTS

| | | |
|---|---|---|
| 8,245,883 B2 | 8/2012 | Luechinger et al. |
| 8,281,959 B2 | 10/2012 | Luechinger |
| 8,851,334 B2 * | 10/2014 | Green ................... A47J 47/01 222/230 |
| 2007/0080179 A1 * | 4/2007 | Brinz ..................... B65B 1/12 222/412 |
| 2008/0142466 A1 * | 6/2008 | Balitski ................ B65D 23/12 215/6 |

* cited by examiner

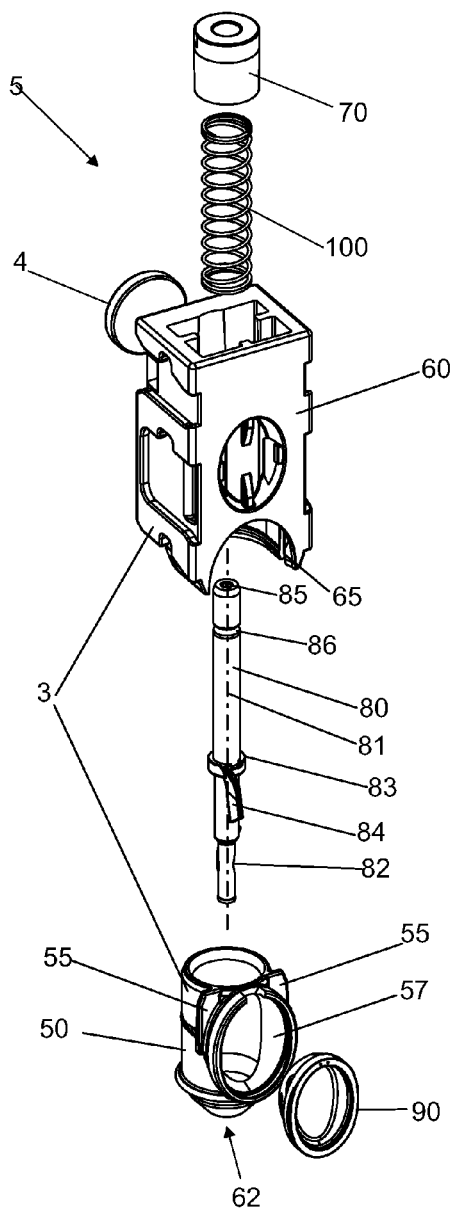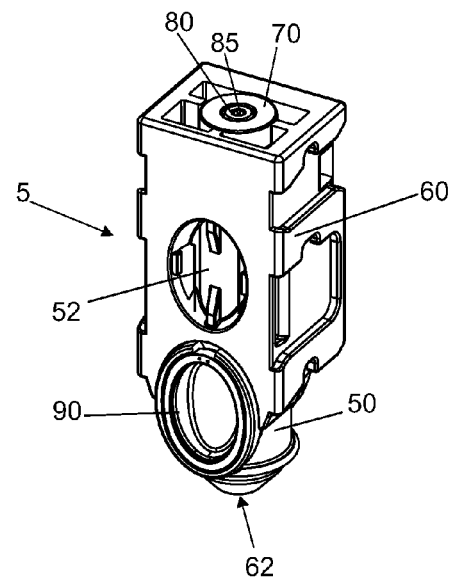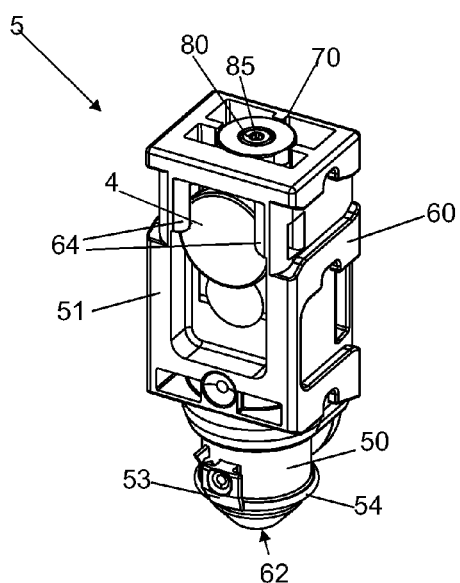
Fig. 1
Fig. 2
Fig. 3

DOSAGE-DISPENSING HEAD

CROSS-REFERENCE TO RELATED APPLICATIONS

This application is entitled to benefit of a right of priority under 35 USC §119 from European patent application 13177422.6, filed on 22 Jul. 2013, the content of which is incorporated by reference as if fully recited herein.

TECHNICAL FIELD

The invention concerns a dispensing head which can be used as a part of a dosage-dispensing device that serves to dispense measured quantities of free-flowing substances, specifically powders and pastes.

BACKGROUND

Dosage-dispensing devices are generally used for the purpose of dispensing small, precisely measured quantities of critical, for example toxic, substances into a target vessel. The latter is normally set on a balance, so that the weight of the dispensed substance can be monitored during the dispensing process and the further discharge of substance into the target vessel can be stopped when the target weight has been reached.

Instruments of the current state of the art such as for example the dosage-dispensing device described in commonly-owned EP 1930702 A1 (also available as U.S. Pat. No. 8,245,883 B2) are characterized by a two-part design structure with, on the one hand, a control unit or base unit and on the other hand a dispensing unit, which can be installed in a receiving- or holding device of the base unit in such a way that the dispensing unit can easily be taken out and exchanged. The dispensing unit, which contains a supply of the substance to be dispensed, includes at least a dispensing head with a discharge orifice and with component elements that serve to open and close the discharge orifice, as well as in certain cases to propel and loosen the powderous or pasteous dosage material. As a further constituent part of the dispensing unit, a source container can be connected to the dispensing head for the purpose of accommodating a bigger supply volume.

The control unit in the dosage-dispensing device of EP 1930702 A1 is a stationary base- or console unit which is set up on a work surface. In the operating state, the discharge orifice of the installed dispensing unit is directed downward, and the means for opening and closing the discharge orifice as well as, in certain cases, for propelling and loosening the powderous or pasteous dosage material are in releasable engagement with propulsion- or actuation elements that are part of the control unit. The dispensing unit in its installed state in the control unit is arranged in a laterally projecting part of the control unit, so as to provide space for a balance below the dispensing unit. For further details, the reader is referred to the European patent application EP 1930702 A1, whose disclosure content in its entirety is hereby incorporated by reference in the present description.

In the dosage-dispensing device described in EP 1930702 A1, the functions of advancing and loosening the powderous or pasteous dosage material are performed through the stirring action of a stirring mechanism in the dispensing head and, in certain cases, a second stirring mechanism in the source container. A further dosage-dispensing device, which is described in commonly-owned EP 1959244 B1 (also available as U.S. Pat. No. 8,191,587 B2), shows the same design structure with a base unit on which an exchangeable dispensing unit is installed. However, the functions of propelling and loosening the dosage material are in this case achieved by imparting shocks to the dispensing unit. The control unit is equipped for this purpose with an impact mechanism, i.e. in essence a hammer mechanism. This solution proves to be particularly advantageous for certain powderous dosage materials such as for example corn starch, which would be compacted by stirring instead of being loosened, so that the flow of material through the dispensing head would be blocked and, as a consequence, no material could be discharged from the dispensing head even with the discharge orifice fully opened. For further details of this dosage-dispensing device with an impact mechanism, the reader is referred to EP 1959244 B2, which is hereby incorporated by reference as if fully recited herein.

Further details and variations of the state of the art, specifically in regard to the dispensing head, can be found in commonly-owned EP 2088404 A1 (also available as U.S. Pat. No. 8,281,959 B2). Among other things, a dispensing head is described wherein the area of the discharge orifice consists of an elastic material, so that the for example slit-shaped orifice can be spread apart through mechanical action, and closed again by removing the mechanical action. In addition, different embodiments of propelling means are presented, as well as designs of the inside which complement the propelling means.

All of the examples of the state of the art named above are characterized by the aforementioned two-part structure with a base/control unit and a dispensing unit that can be installed in the base unit. The ease of installing and removing or exchanging the dispensing unit is a particularly important aspect. A receiving device which is connected to the base unit and in which the dispensing unit can be seated and safely secured is described in commonly-owned EP 1959243 B1 (also available as U.S. Pat. No. 8,042,711 B2).

In each of the dosage-dispensing devices of the state of the art the dispensing unit, which can include the dispensing head by itself or a dispensing head with an attached source container, is designed for long-term, repetitive use, i.e. as a unit which can be refilled again and again with the same or a different dosage substance and which can also be cleaned in between.

In practice, however, a still unmet need has been discovered for a favorably priced, compact dispensing unit, preferably consisting of the dispensing head alone, which can be used, for example, for a small number of dispensing cycles with the same substance and which can subsequently be discarded with the left-over substance remaining inside it. A dispensing unit of this kind offers strong advantages in particular for the dispensing of toxic substances.

It is therefore the object of this invention to provide a dispensing head which can be used as part of a dosage-dispensing device of the kind described for example in EP 1930702 A1 for the dispensing of free-flowing powderous and pasteous substances. The dispensing head should be configured in particular for small fill quantities (typically less than two grams), and its manufacturing cost should be low enough that it could be discarded after use as a consumable supply article.

SUMMARY

This task is solved by a dispensing head with the features according to the independent main claim 1. Further configurations and embodiments of the subject of the invention are presented in the subordinate claims.

A dosage-dispensing head for the dispensing of free-flowing dosage material includes a housing with an interior space to receive the dosage material, a fill opening and a discharge orifice, as well as a shutter bolt arranged in the housing, wherein the shutter bolt is movable in the direction of a shutter bolt axis and rotatable about said shutter bolt axis to perform the functions of opening and closing the discharge orifice and of loosening and advancing the dosage material. In particular, the dispensing head can take on a dispensing position and a fill position that is different from the dispensing position, wherein in the fill position the dosage material can be filled in through the fill opening, and in the dispensing position it can be dispensed through the discharge orifice. In the dispensing position, where the orientation of the shutter bolt is essentially vertical and the discharge orifice is at the bottom end of the dispensing head, the fill opening is positioned laterally on the housing in an essentially vertical orientation. The dispensing head further has a likewise laterally arranged rest surface diametrically opposite the fill opening for the purpose that the dispensing head in the fill position, which is essentially tilted 90° from the dispensing position and thus horizontally oriented with the fill opening on top, can be stably seated on a work surface. The dispensing head further includes a cap to close the fill opening.

In comparison to the dosage-dispensing units and dispensing heads of the state of the art, the arrangement according to the invention with the lateral fill opening and the diametrically opposite rest surface provides a particularly convenient way to fill and, if desired, to store the dispensing head, as the feature of the rest surface allows the filled dispensing heads to be stored or also to be set aside only temporarily without the need for special racks or holders.

Advantageously, a clutch is arranged at the upper end of the shutter bolt (relative to the dispensing position), through which a drive shaft of a control unit can be releasably engaged to drive the axial displacement and rotation of the shutter bolt.

The dispensing head of the invention preferably includes a snap connection between the cap and the housing, whereby in the closed state the cap can be secured in the fill opening.

In advantageous embodiments, the fill opening and the cap preferably have smoothly curved mutually fitting contours of an, e.g., round or in particular elliptical shape. In comparison to an, e.g., rectangular shape of the cap and the fill opening, this makes it easier for the cap to snap into the fill opening. The elliptical contour of the cap and the fill opening is preferred over a circular shape, because it necessarily dictates a certain orientation for setting the cap in place. An elliptical contour has the advantage that the fill opening, while compatible with the rectangular exterior surface, is large and thus facilitates the filling operation, while the contour is free of corners, with a smooth, unbroken perimeter. The longer axis of the ellipse is oriented essentially in the direction of the longer side of the substantially rectangular outside surface of the dispensing head.

The interior cavity of the dispensing head preferably has a cylindrical inside wall, at least in the area of the fill opening, and the inside of the cap, which in the closed state faces towards the interior cavity, is preferably also of cylindrical shape with a flush transition to the interior wall. This design is particularly advantageous in that it avoids edges, gaps and other irregularities in the interior cavity of the dispensing head, where dosage material could accumulate during the dispensing process.

The housing in advantageous embodiments of the dispensing head has a recess on the same side as the fill opening, which serves as a seat for the cap where the latter could be set aside during time periods when the cap is not covering the fill opening, i.e. for example during the filling process or also on an empty dispensing head in either factory-fresh or cleaned condition. After the filling has been completed, the cap is taken out of the recess, set into the fill opening to close up the latter, and securely snapped into place. Only now is the dispensing head turned upright from the fill position into the dispensing position and installed in the base unit of a dosage-dispensing device.

The dosage-dispensing head can further have a seat for a means of identification, for example an RFID transponder, on which data are stored concerning the dosage substance contained in the dispensing unit. As a practical consideration, the seat is designed so that the means of identification can be attached to, or removed from, the housing without a tool.

In preferred embodiments of the dispensing head at least one stirrer element is formed on the shutter bolt, which serves to loosen up the dosage material and to prevent the formation of lumps.

The housing of the dosage-dispensing head is preferably configured with a two-part design structure, wherein a first housing part and a second housing part can be joined together by means of a form-locking connection and without the need for a tool. The form-locking connection between the first and the second housing part is preferably designed as a snap connection.

The upper end (relative to the dispensing position) of the shutter bolt carries a preferably cylindrical shutter bolt cap as a guide for centered movement in an axial passage opening of the dispensing head. The shutter bolt cap is preferably designed to be slid over the the upper end of the shutter bolt and to be attached to the latter through a form-locking snap connection.

The dosage-dispensing head according to the invention contains a return spring which is preferably arranged so that a lower end of the return spring (relative to the dispensing position) is braced against the second housing part and an upper end bears against the shutter bolt cap so that the pre-tensioning force of the return spring pushes the shutter bolt into a rest position which is defined by an axial end stop of the shutter bolt, whereby the dosage-dispensing head is closed up.

BRIEF DESCRIPTION OF THE DRAWINGS

Details of the dosage-dispensing head of the invention are explained in the description of the examples that are illustrated in the drawings, wherein:

FIG. 1 shows an exploded view of a dosage-dispensing head according to the invention;

FIG. 2 shows the dosage-dispensing head of FIG. 1 with the view directed at the fill opening;

FIG. 3 shows the dosage-dispensing head of FIG. 1 with the view directed at the rest surface;

DETAILED DESCRIPTION

Figure 4:
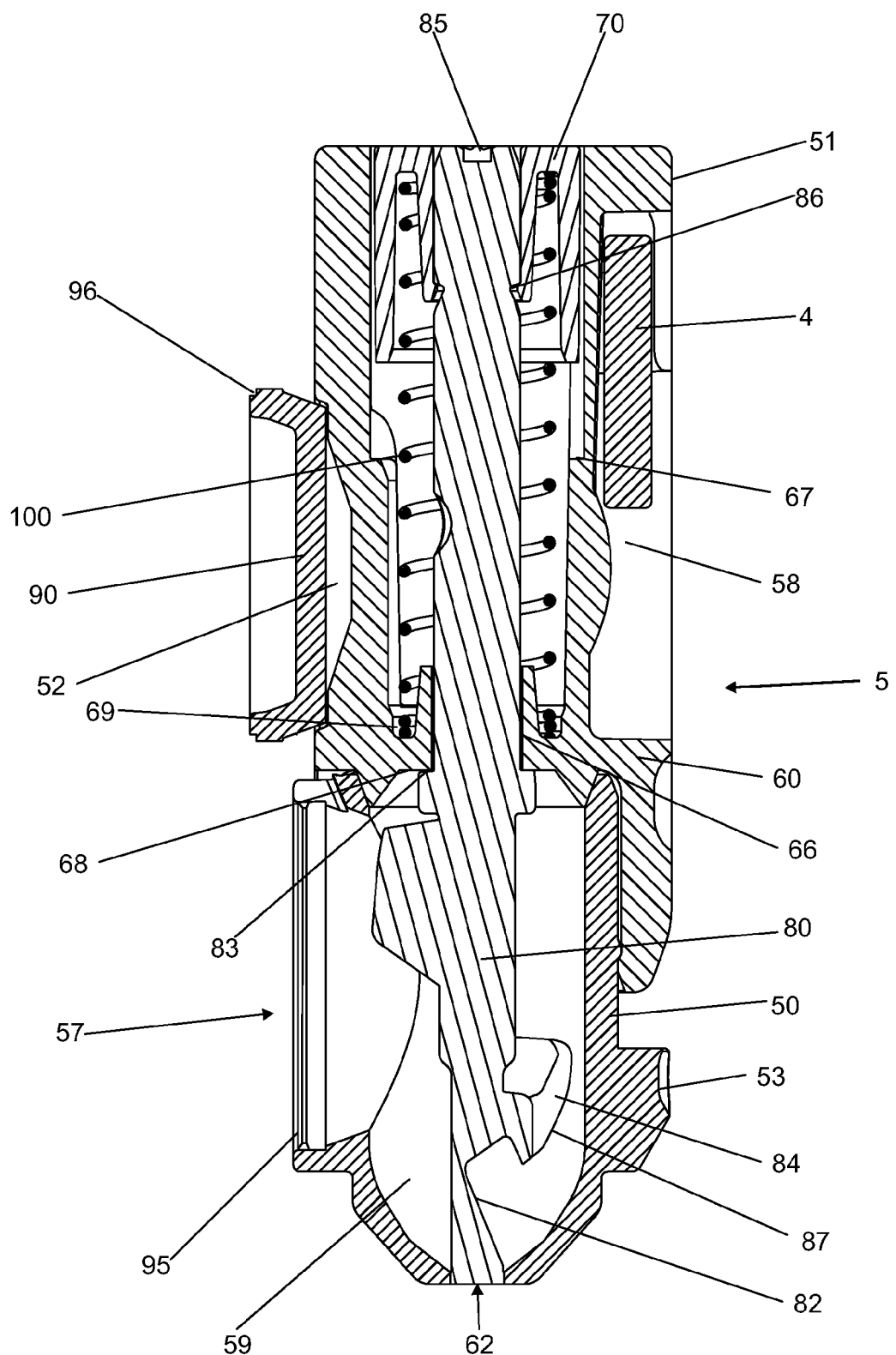
FIG. 4 shows the dosage-dispensing head of FIG. 1 in a sectional view in the plane of the shutter bolt axis.

FIG. 1 shows an exploded view of a preferred embodiment of the dosage-dispensing head 5 according to the invention. The two-part design structure of the housing 3 is evident with a first, lower housing part 50 (relative to the dispensing position) and a second, upper part 60. The first housing part 50 includes the discharge orifice 62 which, in the dispensing position, is located at the lower end, as well as the laterally arranged and essentially vertical fill opening 57 which can be closed up with the cap 90. A snap connection is used advantageously to keep the cap 90 securely seated in the fill opening 57. Further, insertion guides 55 are arranged on the first housing part 50 on either side of the fill opening. To join the first and second housing parts 50, 60 together, the insertion guides 55 are set into the guide grooves 65 of the upper, second housing part 60, whereby an exact alignment of the two housing parts 50 and 60 is achieved. The second housing part 60, on the side which in FIG. 1 faces the viewer, has a recess 52 in which the cap 90 can be kept when it is not seated in the fill opening 57, i.e. for example during transport or during the filling process, or also on an empty dispensing head in either factory-fresh or cleaned condition.

FIG. 1 further shows the shutter bolt 80 which, in the operating state of the dosage-dispensing head 5, is rotatable about the shutter bolt axis 81 as well as movable up and down in the direction of the shutter bolt axis 81. The further details of the shutter bolt 80 that are identified by reference symbols in FIG. 1, as well as the return spring 100, the shutter bolt cap 70 and the means of identification 4 will be explained in the context of the following FIGS. 2 to 4.

FIG. 2 shows the dosage-dispensing head 5 of FIG. 1 with the housing parts 50 and 60 in the assembled state in dispensing position, with the view directed at the fill opening 57 which is closed by the cap 90. Located above the closed fill opening 57 is the recess 52 which serves as a seat, where the cap 90 can be kept and advantageously secured by an easily releasable snap connection. In FIGS. 2 and 3, on the upward-facing side of the dosage-dispensing head 5, the shutter bolt cap 70 can be seen which is attached to the shutter bolt 80 by a snap connection. The upward-facing end of the shutter bolt 80 which appears at the center of the shutter bolt cap 70 is configured as a clutch 85, whereby a drive shaft 11 of a dosage-dispensing device 1 (see FIG. 5) can be brought into a releasable engagement with the shutter bolt 80 to drive the axial and rotary movements of the latter.

FIG. 3 shows the dosage-dispensing head 5 from the opposite side which faces away from the fill opening 57 and whose entire border area is designed as a rest surface 51 which, as already described, serves the purpose that in the fill position, i.e. when the dosage-dispensing head 5 is essentially tilted by 90° from the dispensing position, with the fill opening 57 on top and oriented horizontally, it can be stably positioned on a work surface. A recess 58 that is surrounded by the rest surface 51, contains a seat 64 of a means of identification 4 which can exist, e.g., of an RFID transponder. Also shown in FIG. 3 is an electrical contact pad 53 which serves to drain electrostatic charges which, during operation, can build up in the plastic material that the dosage-dispensing head 5 is made of and which, due to electrostatic cohesion, can impede the discharge of the dosage material from the dosage-dispensing head. The first housing part 50 in the illustrated embodiment is predominantly cylindrical and, in its lowest portion, conically tapered towards the discharge orifice 62. Arranged at the transition from the cylindrical to the conical shape is a border ring 54 which serves a sealing function when the conical part of the dosage-dispensing head is set into a corresponding circular opening in the top panel of a draft shield housing (not shown in the drawings), in which a target vessel for the dispensed substance is located.

The sectional view of FIG. 4 illustrates in particular the arrangement of the shutter bolt 80 in the dosage-dispensing head 5. When the dispensing head 5 is being assembled from its individual parts 50, 60, 70, 80, 90, 100, the first step is to insert the shutter bolt 80 from below (relative to FIG. 4) into the axial passage opening 66 of the second housing part 60, to the point where the stop 83 of the shutter bolt 80 rests against the shoulder 68 of the passage opening 66. Next, the return spring 100 is slid over the shutter bolt 80 from the upper end of the axial passage opening 66 and pushed home against the bottom of the ring-shaped seating groove 69. The shutter bolt cap 70 is slid over the shutter bolt 80 and the return spring 100, thereby compressing the latter, and by snap engagement with the circular groove 86, the shutter bolt cap 70 is locked to the shutter bolt 80. The first housing part 50 is set into the second housing part 60 and snapped securely into position. The cap 90 is set into the recess 52 of the second housing part, where it is held by an easily releasable snap connection until the dispensing head is put into operation. Likewise in the assembly process of the dosage-dispensing head 5, a means of identification 4, for example an RFID transponder unit, can be installed in the recess 58. Configured as a projection on the right side (in FIG. 4) of the first housing part 50, the contact pad 53, through electrical contact with the dosage-dispensing apparatus 1 (see FIG. 5) serves to drain electrostatic charges from the first housing part 50 into the electrically grounded dosage-dispensing apparatus 1. For this drainage of charges to take place, it is intended to produce the first housing part 50 with the contact pad 53 of an electrically conductive material. Advantageously, the contact pad consists of an electrically conductive polymer.

When the dosage-dispensing head 5 is in its rest position as shown in FIG. 4, the stop 83 of the shutter bolt 80, under the pre-tensioning force of the return spring 100, is pushed against the shoulder 68 at the bottom end of the axial passage opening 66, so that the shutter bolt cap 70 at the upper end (in FIG. 4) of the shutter bolt 80 is flush with the level of the top surface of the dispensing head 5, while the lower end of the shutter bolt 80 fills out, and thereby blocks, the discharge orifice 62.

Figure 5:
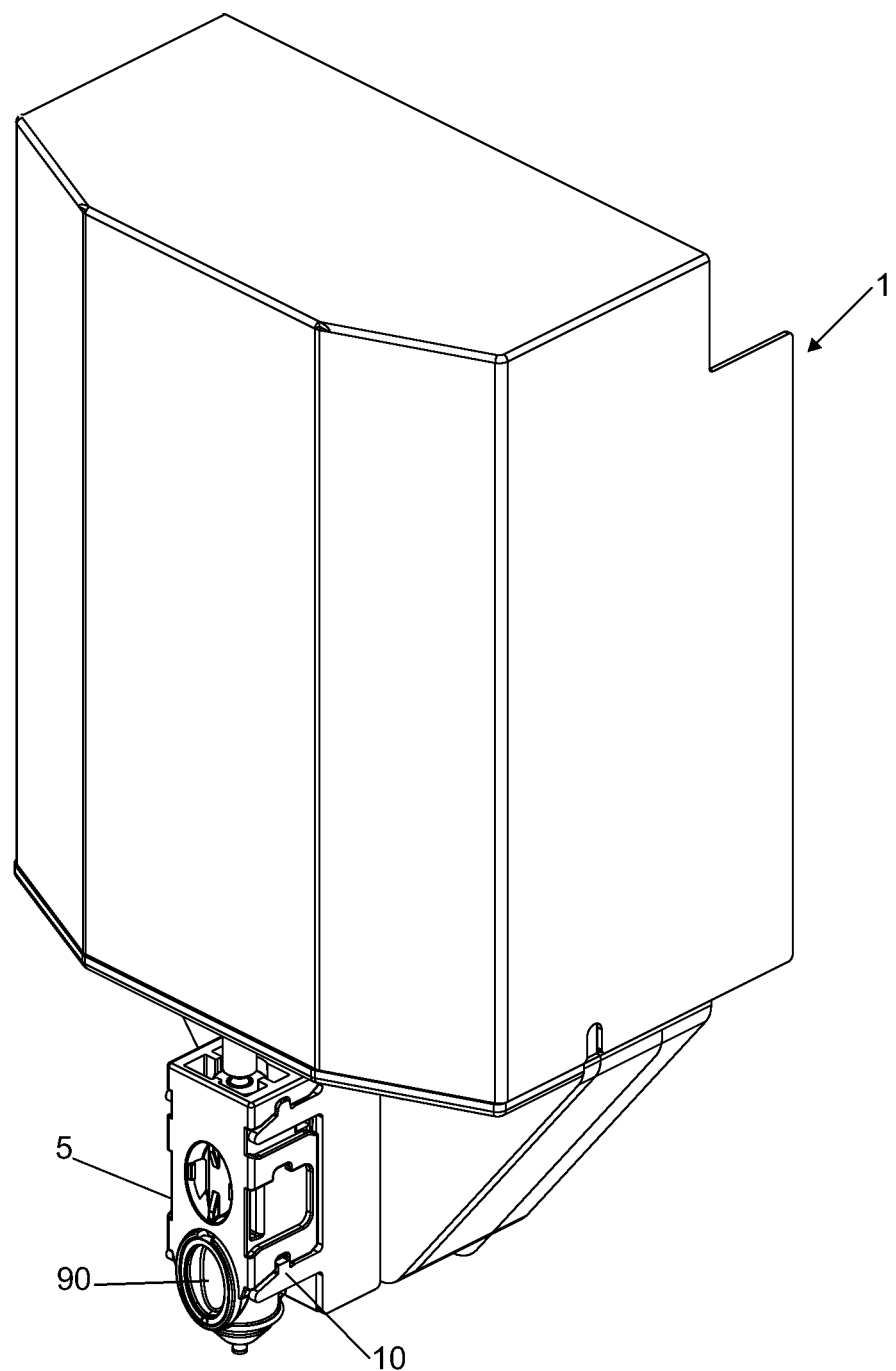
FIG. 5 shows a dosage-dispensing device with the dosage-dispensing head according to the invention.

The function of the shutter bolt 80 can be explained by means of FIGS. 4 and 5. To perform a dispensing process, a filled dispensing head 5 is set into the holder device 10 of a dosage-dispensing device 1 (FIG. 5). Typically, a target vessel (not shown in the drawing) will be placed on a balance below the dosage-dispensing head 5. In the dispensing process, which is in most cases controlled automatically, the drive shaft 11 which can rotate about its axis and in certain cases simultaneously perform a vertically pulsating knocking movement is lowered to the dispensing head 5 and brought into engagement with the clutch 85 of the shutter bolt 80. When fully engaged, the drive shaft 11 pushes the shutter bolt 80 further in the downward direction against the biasing force of the return spring 100, while the rotation and, if applicable, the superimposed axial knocking movement of the drive shaft 11 are transmitted to the shutter bolt 80. With the downward displacement of the cutback 82, a variable, controllable portion of the aperture cross-section of the discharge orifice is set free for the passage of dosage material. Simultaneously, the dosage material in the interior space 59 of the first housing part 50 is loosened and propelled towards the discharge orifice 62 by the rotation and, if applicable, the additional axial knocking movement of at least one stirrer element 84 which is formed on the shutter bolt 80. In particular with the maximally possible downward displacement of the shutter bolt, which is delimited by the step 67 of the second housing part 60 stopping the shutter bolt cap 70, the outside edge 87 of the stirrer element 84 which conforms to the interior wall contour is sweeping the latter in the vicinity of the discharge orifice 62, whereby dosage material that is present in this zone is swept off and moved towards the discharge orifice 62.

Figure 6:
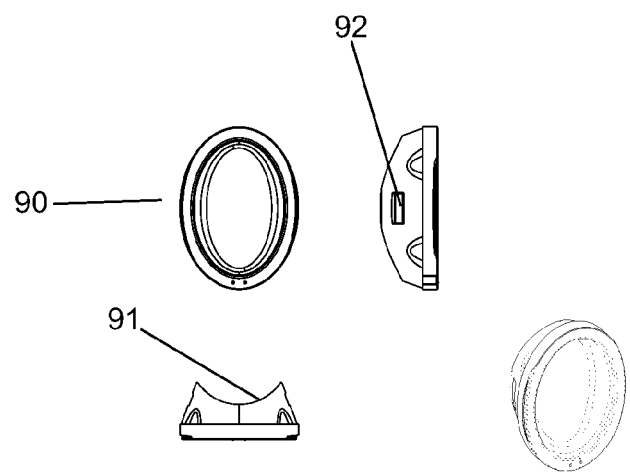
FIG. 6 shows the cap of the fill opening of a dosage-dispensing head according to the invention in different views.

FIG. 6 shows the cap 90 of the fill opening in three normal projections and in a perspective view. Two indentations 92, one of which is visible in the drawing, serve to hold the cap 90 in the recess 52 through their easily releasable snap engagement with projections of complementary shape in the recess 52. In the fill opening 57, on the other hand, the cap 90 is fastened and sealed along it entire circumference. This fastening and sealing connection can be achieved for example with a ridge 95 (see FIG. 4) which runs along the inside circumference of the fill opening 57 and snaps into a correspondingly shaped set-back 96 along the outside edge of the cap 90. The cylindrical inside surface 91 of the cap is shaped so as to fit into the cylindrical wall of the interior space 59 with a practically break-free transition.

Figure 7:
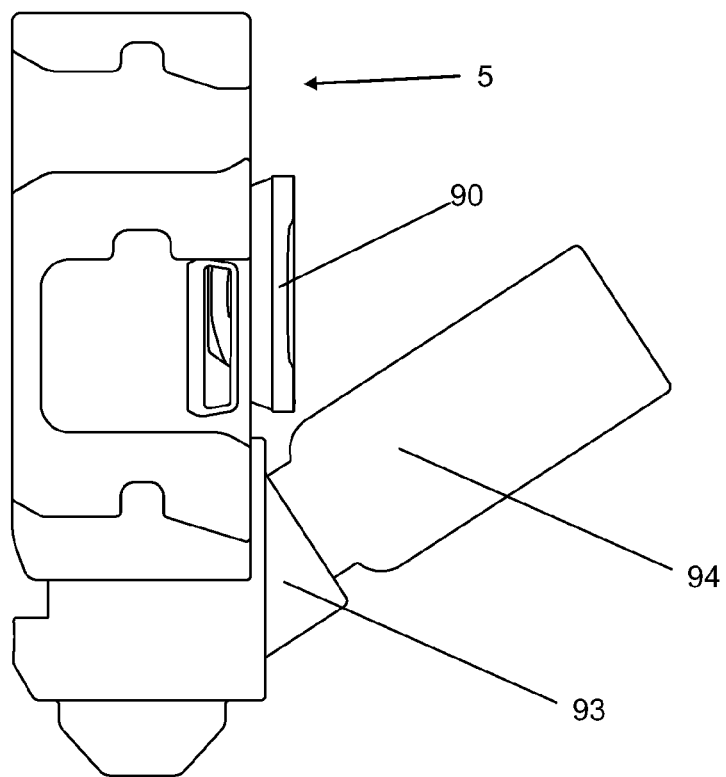
FIG. 7 shows the dosage-dispensing head of FIG. 1 with an optional source container attached.

FIG. 7 again shows the dosage-dispensing head 5 of FIG. 1, but instead of the cap 90 an adapter 93 is installed in the fill opening 57, allowing a source container 94 to be connected to the dispensing head 5. As the cap 90 is not used in this case, it remains in the recess 52.

Although the invention has been described through the presentation of specific examples, it will be evident to the reader that numerous further variant embodiments could be developed from the teachings of the present invention, for example by combining the features of the individual embodiments with each other or by interchanging individual functional units of the individual embodiments against each other.

What is claimed is:

1. A head for use in association with a device for dispensing measured dosages of a free-flowing material, the dosage-dispensing device having a drive shaft, the head having a first orientation that is a dispensing position and a second orientation that is a fill position, the head comprising:
   a housing, comprising:
      an interior space to receive the material;
      a fill opening, in communication with the interior space and arranged on the housing to be on an upper face thereof when the head is in the fill position and to be on a lateral face when the head is in the dispensing position;
      a discharge orifice, also in communication with the interior space, the discharge orifice arranged on the housing to be at a lower end thereof when the head is in the dispensing position and on a lateral face when the head is in the fill position; and
      a rest surface, positioned diametrically opposite the fill opening, such that the housing lies on the rest surface when in the fill position; and
   a shutter bolt, arranged in the housing and movable, axially and rotationally about a longitudinal axis thereof, to open and close the discharge orifice and to loosen and advance the material in the interior space, the shutter bolt being oriented substantially vertically when the head is in the dispensing position.

2. The head of claim 1, further comprising:
a stirrer element, formed on the shutter bolt.

3. The head of claim 1, further comprising:
a clutch, arranged on an end of the shutter bolt that is the upper end when the head is in the dispensing position, for releasably engaging the drive shaft for axial displacement and rotation of the shutter bolt.

4. The head of claim 1, further comprising:
a cap; and
a snap connection between the cap and the housing, such that, in a closed state, the fill opening is closed and sealed by the cap.

5. The head of claim 4, wherein the fill opening and the cap have perimeters with smoothly curved complementary contours.

6. The head of claim 5, wherein the perimeters are elliptical.

7. The head of claim 4, wherein:
the interior space has a cylindrical inside wall, at least in the area of the fill opening; and
the cap has an interior surface which is of cylindrical shape with a flush transition to the inside wall, the interior surface facing towards the interior space when in the closed state.

8. The head of claim 4, further comprising:
a recess in the housing, the recess sized to receive the cap when the cap is not seated in the fill opening.

9. The head of claim 1, further comprising:
a seat, arranged on the housing; and
a means for identification, on which data are stored concerning the material contained in the head, the means for identification configured for removable placement in the seat in a tool-less manner.

10. The head of claim 1, wherein:
the housing is configured as a two-part structure comprising a first housing part and a second housing part that are joined together by a form-locking connection in a tool-less manner.

11. The head of claim 10, wherein the form-locking connection is a snap connection.

12. The head of claim 1, further comprising:
an axial passage opening of the housing; and
a cap that guides an upper end of the shutter bolt, relative to the dispensing position, in centered movement in the axial passage opening.

13. The head of claim 12, wherein the cap associated with the shutter bolt is sized and adapted to slide over the upper end of the shutter bolt and connected thereto by a form-locking snap connection.

14. The head of claim 12, further comprising:
a means for biasing, arranged to push the shutter bolt axially upwards into a rest position defined by an axial end stop of the shutter bolt.

15. The head of claim 14, wherein the means for biasing is a compressive helix spring that concentrically surrounds the shutter bolt, a first end of the spring braced against the housing and a second end bearing against the cap that guides the shutter bolt.

16. The head of claim 1, further comprising:
an electrically-conductive contact pad for draining electrostatic charges therefrom.

17. A head for use in association with a device for dispensing measured dosages of a free-flowing material, the dosage-dispensing device having a drive shaft, the head having a first orientation that is a dispensing position and a second orientation that is a fill position, the head comprising:
a housing, configured as a two-part structure with a first and a second housing part, the housing parts joined together by a form-locking connection in a tool-less manner, the housing comprising:
an interior space to receive the material;
a fill opening, in communication with the interior space and arranged on the housing to be on an upper face thereof when the head is in the fill position and to be on a lateral face when the head is in the dispensing position;
a discharge orifice, also in communication with the interior space, the discharge orifice arranged on the housing to be at a lower end thereof when the head is in the dispensing position and on a lateral face when the head is in the fill position;
an axial passage opening; and
a rest surface, positioned diametrically opposite the fill opening, such that the housing lies on the rest surface when in the fill position;
a shutter bolt, arranged in the housing and movable, axially and rotationally about a longitudinal axis thereof, to open and close the discharge orifice and to loosen and advance the material in the interior space, the shutter bolt being oriented substantially vertically when the head is in the dispensing position;
a cap that guides an upper end of the shutter bolt, relative to the dispensing position, in centered movement in the axial passage opening; and
a closure cap associated with the housing by a snap connection therebetween, such that, in a closed state, the fill opening is closed and sealed by the cap.

* * * * *